Sept. 29, 1959 L. A. RUNTON ET AL 2,906,567
RAILWAY JOURNAL BEARING
Filed July 29, 1957 2 Sheets-Sheet 1

INVENTORS
LESLIE A. RUNTON
HENRY C. MORTON
BY
ATTORNEY

Sept. 29, 1959 L. A. RUNTON ET AL 2,906,567
RAILWAY JOURNAL BEARING
Filed July 29, 1957 2 Sheets-Sheet 2
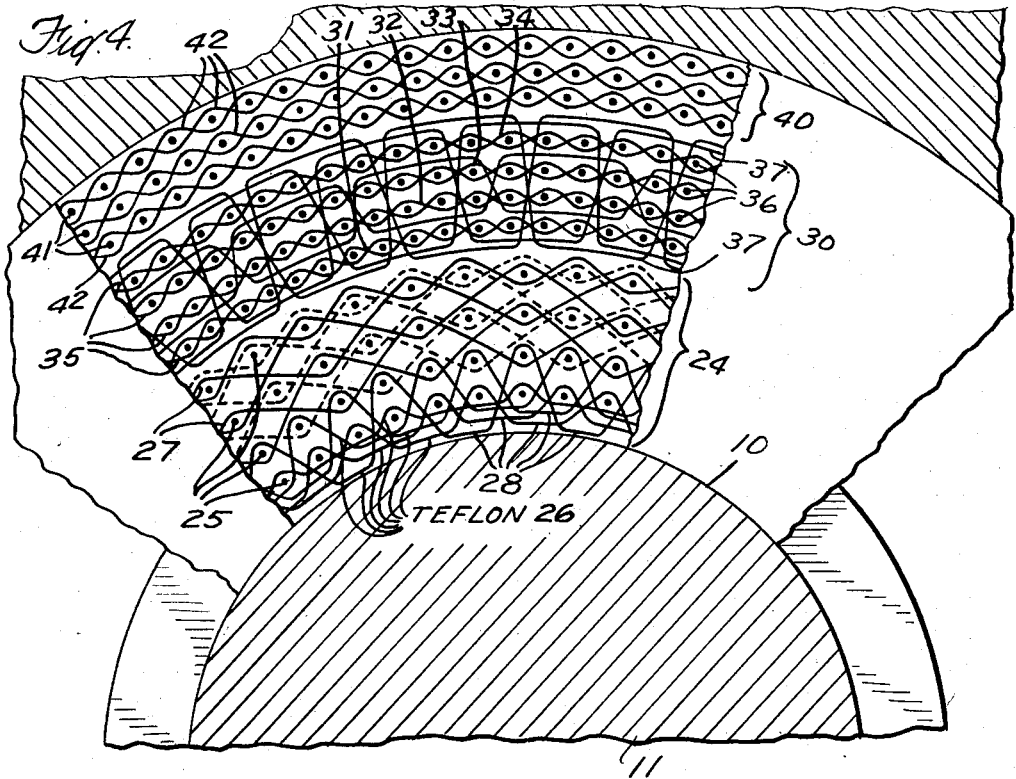
Fig. 4.
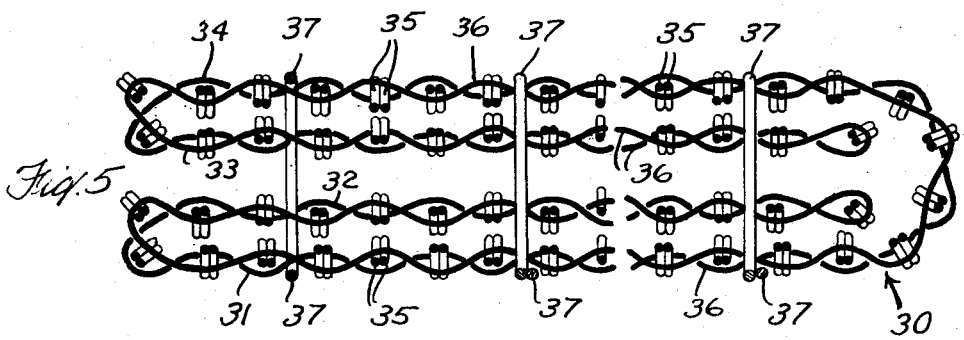
Fig. 5.
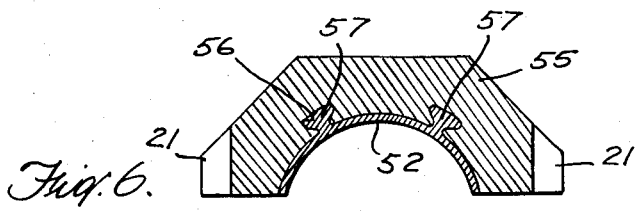
Fig. 6.
INVENTORS
LESLIE A. RUNTON
HENRY C. MORTON
BY
ATTORNEY › # United States Patent Office 2,906,567
Patented Sept. 29, 1959

2,906,567
RAILWAY JOURNAL BEARING

Leslie A. Runton, Middle Haddam, and Henry C. Morton, Branford, Conn., assignors to The Russell Manufacturing Company, Middletown, Conn., a corporation of Connecticut Application July 29, 1957, Serial No. 674,835

3 Claims. (Cl. 308—53)

This invention relates to bearings for railway journals and more particularly to a self-lubricating bearing for use in journal boxes of freight cars or the like.

An object is to provide a bearing of the above type having novel and improved characteristics.

Another object is to provide an anti-friction bearing surface for railway journals of the above type.

Another object is to provide a bearing composed primarily of woven fabric having a surface composed of multifilament Teflon yarn which has such a low coefficient of friction that it is self-lubricating under normal conditions of use.

Other objects and advantages will be apparent as the nature of the invention is more fully disclosed.

In accordance with the present invention Teflon (tetrafluoroethylene), a multi-filament yarn is woven into a fabric backing in such a way that the Teflon is exposed at the surface but is bound mechanically by the interwoven yarns. The fabric is plied with a reinforcing layer having metal threads running circumferentially of the bearing and backed by a sufficient number of fabric plies to build the fabric up to the desired thickness.

The plied fabric is impregnated with a heat setting phenolic resin and welded under heat and pressure to produce a rigid unit in the shape of the desired bearing with the Teflon yarn exposed on the bearing surface.

It has been found that Teflon in multi-filament form has the property of having no cold flow under pressure while its coefficient of friction varies inversely as the pressure. Hence under the loading encountered in railway journals the material can be operated for long periods of time without lubrication. Also if the Teflon is woven with other yarns having a high heat resistance, such as spun Dacron, the bearing will withstand high temperature without impairing its operation. The invention will be better understood from the following description, taken in connection with the accompanying drawings in which a specific embodiment has been set forth for purposes of illustration.

In the drawings:

Fig. 4 is an expanded diagrammatic view illustrating the weave of the fabric bearing member;

Fig. 5 is a detail view illustrating the weave of the reinforcing ply; and

Fig. 6 is a section through a bearing illustrating a further embodiment of the invention.

Figure 1:
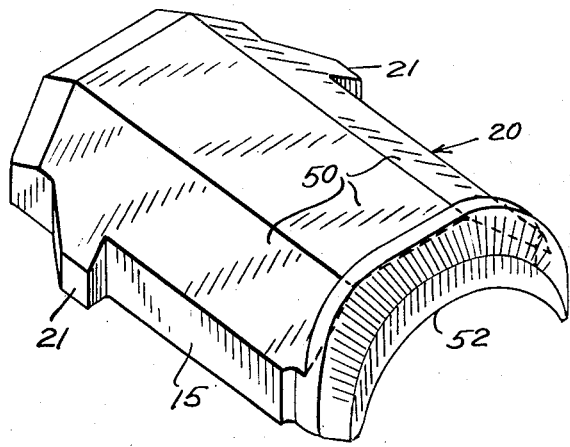
Fig. 1 is a perspective view of a bearing embodying the invention.
Figure 2:
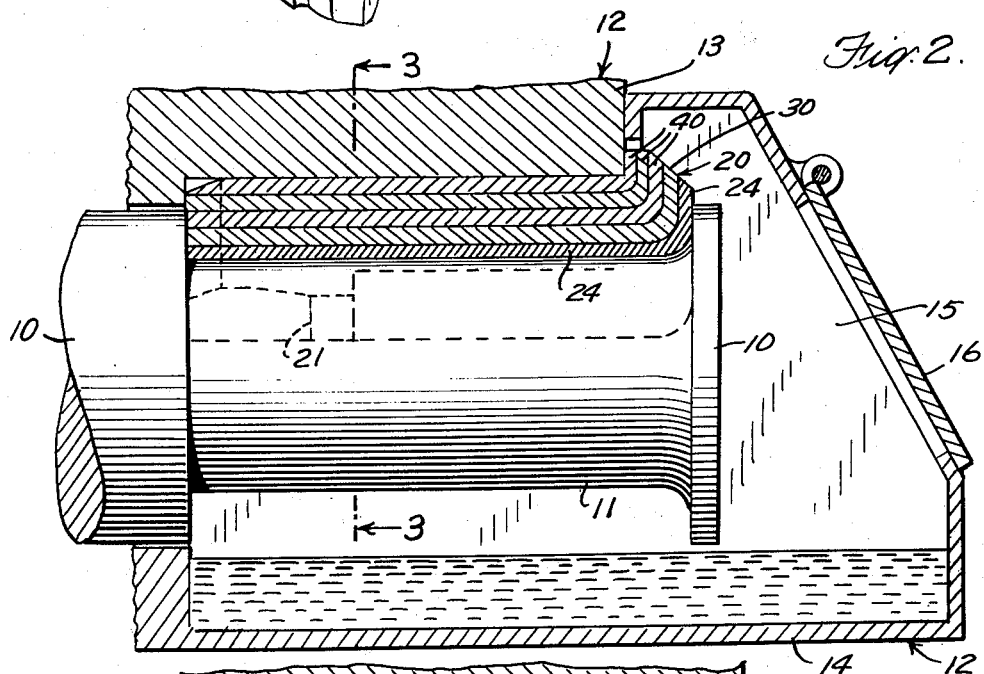
Fig. 2 is an axial section through a railway journal box showing the bearing in place.
Figure 3:
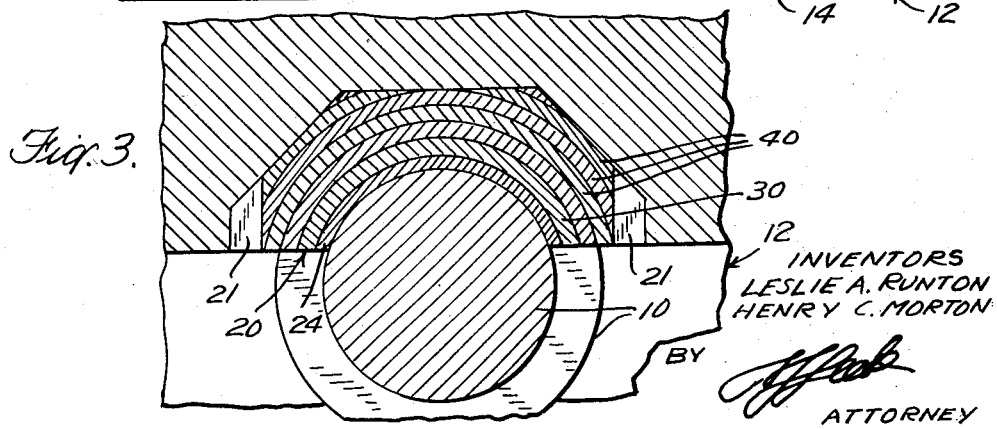
Fig. 3 is a transverse section taken on the line 3—3 of Fig. 2.

Referring to the drawings more in detail the invention is shown in connection with an axle 10 of the type used on freight cars, having a journal 11 extending into a journal box 12 having top and bottom walls 13 and 14 respectively, side walls 15 and an access door 16. The portion of the box 12 below the journal 11 provides an oil reservoir from which oil is wicked by packing material (not shown) to the journal.

The top wall 13 of the box 12 is shaped to provide a seat or saddle in which the bearing member 20 (Fig. 1) is seated to rest upon the journal 11. The bearing member 20 is formed with a pair of positioning legs 21 which seat in corresponding recesses in the box 12 to hold the bearing member in place during use. The parts thus far described are of standard construction and only so much thereof has been set forth as is necessary to an understanding of the present invention which is applicable to any standard type of journal box and is not to be restricted to the particular form above described.

In accordance with the invention the bearing member 20 is composed of a plurality of fabric layers to be described. The lowermost layer 24 comprises a woven fabric having a plurality of plies of filler shots 25 interwoven with chain warps 26 and 27. The warps 26 are composed of multi-filament Teflon yarn and are woven around the filler shots 25 of the two lower plies to form exposed loops 28 at the lower bearing surface in contact with the journal 11. The warps 27 of the remaining plies are crossed to bind the plies together in a unitary fabric layer. A fabric of this type is shown more in detail in copending application Serial No. 662,071, filed May 28, 1957, now Patent No. 2,862,283. The second fabric layer 30 is shown as composed of a plurality of plies 31 to 34 composed of warp yarns 35 bound into a continuous folded fabric by filler yarns 36 as shown in Fig. 5. The plies of the layer 30 are bound together by binder chain 37 of metal which serve to reinforce the assembly in the direction of greatest stress. A fabric of this type is shown more in detail in copending application Serial No. 596,212, filed July 6, 1956, now Patent No. 2,864,409.

A plurality of additional backing layers 40 are provided to build the bearing member to the desired thickness. These layers 40 are composed of woven fabric having filler yarns 41 and warp yarns 42 woven in any conventional manner.

The yarns above described, other than the Teflon yarns 26 and metal yarns 37 are preferably composed of heat-resistant material such as spun Dacron. However, other materials, such as nylon, Orlon, asbestos, rayon or cotton may be used if desired. The second layer may be omitted if the reinforcing metal binders 37 are not required, and replaced by additional layers 40 to build up the desired thickness.

The laminated fabric may be impregnated with a high strength phenolic bonding resin derived from the reaction product of phenol, cresol or a homologue with formaldehyde under controlled conditions.

The plied fabric is first impregnated with the uncured bonding resin as above described. The treated base is preheated to remove the solvent and the resin content polymerized until a residual volatile content of 5% to 7% is attained.

After assembly of the treated fabric into a preform, the impregnated assembly is placed in a mold and molded under heat and pressure into the desired finished form, as shown in Fig. 1. The conversion of the resin into a thermoset form may be accomplished at a temperature of 300° F. to 350° F. for from thirty to sixty minutes at pressures of 10 tons to 100 tons, depending upon the area of the object being molded.

The assembly is thus molded under heat and pressure to the shape required to replace the usual metal bearing. As shown in Fig. 1 the bearing element 20 having an outer surface 50 conforming to the top 13 of the journal box 12, an under surface 52 conforming to the journal 11 and lugs 21 adapted to seat in the usual positioning recesses in the journal box.

In certain instances the usual metal backing may be used in place of the backing layers 30 and 40. Fig. 6 illustrates such an embodiment comprising a metal backing 55 from which the inner layer of bearing metal has been removed and replaced by fabric layer 24 having a Teflon bearing surface as described above. The fabric layer 24 having the Teflon bearing surface is impregnated and molded in the manner above described. However, in this embodiment the backing metal 55 may be used as one of the mold elements in which the fabric layer 24 is formed. For this purpose the backing metal 55 is shown as provided with dovetailed slots 56 into which the impregnated fabric layer 24 is forced during the molding operation to provide locking ribs 57 which assist in securing the molded fabric in place. Of course the molded fabric may be cemented or otherwise secured to the backing metal 55 if desired.

The Teflon bearing above described is less expensive than the usual metal bearing and has superior properties as herein set forth. It may be used with the usual lubricating means and when used does not produce a "hot box" if the oil should be allowed to become exhausted as the bearing surface is self-lubricating.

What is claimed is:

1. A bearing element for journals of railway cars having a journal running in a journal box, comprising a multilayer molded fabric, one of said layers comprising a woven fabric having at least two rows of filler shots, Teflon yarns forming surface floats spanning at least two successive filler shots and bound under the succeeding filler shots of both of said rows for securing said Teflon yarns in place, a second of said layers comprising a multiply fabric having a plurality of plies of interwoven warps and fillers, the adjacent plies being joined at their edges to form a continuous folded fabric, metal binder strands passing through the plies of said folded fabric for reinforcing the same and extending in a direction generally parallel to said Teflon yarns for mechanically reinforcing the same, a third of said layers comprising a plurality of plies of woven backing fabric, the yarns of said layers other than said Teflon yarns being composed of a material capable of bonding to an impregnating resin, said layers being impregnated with a thermosetting bonding resin, said resin being in the condition characteristic of having been cured under heat and pressure and forming a rigid unitary structure wherein the Teflon yarns are exposed to form the bearing surface.

2. A bearing element for journals of railway cars as set forth in claim 1 in which said layers are carried by a metal backing member conforming to the shape of the journal and having dovetailed grooves on its inner surface and said backing fabric includes resin-impregnated molded fabric members disposed in said grooves and bonding said backing fabric thereto.

3. A bearing element as set forth in claim 1 in which the resin-bondable yarns are composed of spun Dacron.

References Cited in the file of this patent

UNITED STATES PATENTS

| | | |
|---|---|---|
| 905,355 | Peckham | Dec. 1, 1908 |
| 2,681,223 | Walters et al. | June 15, 1954 |
| 2,804,886 | White | Sept. 3, 1957 |

OTHER REFERENCES

Wall Street Journal, May 11, 1956, (page 2, columns 5 anl 6).